US009805712B2

(12) United States Patent
Li et al.

(10) Patent No.: US 9,805,712 B2
(45) Date of Patent: Oct. 31, 2017

(54) METHOD AND DEVICE FOR RECOGNIZING VOICE

(71) Applicant: BAIDU ONLINE NETWORK TECHNOLOGY (BEIJING) CO., LTD., Beijing (CN)

(72) Inventors: Bo Li, Beijing (CN); Zhiqian Wang, Beijing (CN); Na Hu, Beijing (CN); Xiangyu Mu, Beijing (CN); Lei Jia, Beijing (CN); Wei Wei, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 0 days.

(21) Appl. No.: 14/896,588

(22) PCT Filed: Dec. 18, 2014

(86) PCT No.: PCT/CN2014/094277
§ 371 (c)(1),
(2) Date: Dec. 7, 2015

(87) PCT Pub. No.: WO2015/149543
PCT Pub. Date: Oct. 8, 2015

(65) Prior Publication Data
US 2017/0011736 A1    Jan. 12, 2017

(30) Foreign Application Priority Data
Apr. 1, 2014    (CN) .......................... 2014 1 0129541

(51) Int. Cl.
*G10L 15/00*    (2013.01)
*G10L 15/01*    (2013.01)
(Continued)

(52) U.S. Cl.
CPC .............. *G10L 15/01* (2013.01); *G10L 15/02* (2013.01); *G10L 15/08* (2013.01); *G10L 15/183* (2013.01);
(Continued)

(58) Field of Classification Search
CPC ..... G10L 15/30; G10L 15/083; G10L 15/197; G10L 15/20; G10L 15/32; H04M 2201/40; H04M 2250/74
(Continued)

(56) References Cited

U.S. PATENT DOCUMENTS 5,899,973 A * 5/1999 Bandara ................ G10L 15/197
704/238
5,956,683 A * 9/1999 Jacobs .................... G10L 15/02
704/201
(Continued)

FOREIGN PATENT DOCUMENTS

CN    1455387    11/2003
CN    1607576    4/2005
(Continued)

OTHER PUBLICATIONS

International Searching Authority, International Search Report for PCT/CN2014/094277 dated Mar. 15, 2015.

*Primary Examiner* — Michael Colucci
(74) *Attorney, Agent, or Firm* — Hodgson Russ LLP

(57) ABSTRACT

A method for recognizing a voice and a device for recognizing a voice are provided. The method includes: collecting voice information input by a user; extracting characteristics from the voice information to obtain characteristic information; decoding the characteristic information according to an acoustic model and a language model obtained in advance to obtain recognized voice information, wherein the acoustic model is obtained by data compression in advance.

11 Claims, 4 Drawing Sheets

(51) Int. Cl.
  *G10L 15/02* (2006.01)
  *G10L 15/08* (2006.01)
  *G10L 15/183* (2013.01)
  *G10L 19/02* (2013.01)
  *G10L 19/022* (2013.01)
(52) U.S. Cl.
  CPC ........ *G10L 19/0208* (2013.01); *G10L 19/022* (2013.01)
(58) Field of Classification Search
  USPC ....................................................... 704/237
  See application file for complete search history.

(56) References Cited

U.S. PATENT DOCUMENTS

| | | | |
|---|---|---|---|
| 6,223,155 B1* | 4/2001 | Bayya | G10L 15/07 704/243 |
| 7,966,183 B1* | 6/2011 | Yao | G10L 15/10 704/231 |
| 8,990,076 B1* | 3/2015 | Strom | G10L 15/02 704/222 |
| 9,123,343 B2* | 9/2015 | Kurki-Suonio | G10L 15/30 |
| 9,355,636 B1* | 5/2016 | O'Neill | G10L 15/142 |
| 2001/0056346 A1* | 12/2001 | Ueyama | G10L 15/30 704/246 |
| 2003/0088402 A1 | 5/2003 | Hoory et al. | |
| 2004/0024599 A1 | 2/2004 | Deisher | |
| 2005/0038647 A1* | 2/2005 | Baker | G10L 15/065 704/231 |
| 2006/0100871 A1* | 5/2006 | Choi | G01C 21/3608 704/254 |
| 2006/0212295 A1* | 9/2006 | Wasserblat | G10L 25/48 704/252 |
| 2007/0050190 A1 | 3/2007 | Washio et al. | |
| 2008/0195387 A1* | 8/2008 | Zigel | G10L 17/06 704/236 |
| 2009/0018826 A1* | 1/2009 | Berlin | G10L 15/07 704/223 |
| 2009/0030676 A1* | 1/2009 | Xu | G10L 15/02 704/203 |
| 2009/0030698 A1* | 1/2009 | Cerra | G10L 15/183 704/275 |
| 2009/0043573 A1* | 2/2009 | Weinberg | G10L 17/06 704/223 |
| 2010/0007665 A1* | 1/2010 | Smith | G06T 13/40 345/473 |
| 2010/0185448 A1* | 7/2010 | Meisel | G10L 15/22 704/256.1 |
| 2011/0035219 A1* | 2/2011 | Kadirkamanathan | G10L 15/005 704/239 |
| 2011/0066634 A1* | 3/2011 | Phillips | G10L 15/22 707/769 |
| 2014/0039901 A1* | 2/2014 | Mosko | H04M 11/066 704/500 |

FOREIGN PATENT DOCUMENTS

| | | |
|---|---|---|
| CN | 102063900 | 5/2011 |
| CN | 103915092 | 7/2014 |

* cited by examiner

METHOD AND DEVICE FOR RECOGNIZING VOICE

CROSS REFERENCE TO RELATED APPLICATION

This application is a national phase entry under 35 USC §371 of International Application PCT/CN2014/094277, filed Apr. 1, 2014, which claims priority to and benefits of Chinese Patent Applications No. 201410129541.4, filed with the State Intellectual Property Office of P. R. China on Apr. 1, 2014, the entire contents of which are incorporated herein by reference.

FIELD

The present disclosure generally relates to the field of intelligent processing technology, and more particularly, to a method and a device for recognizing a voice.

BACKGROUND

The voice recognition technology is one of the important technologies in the field of information technology, and the voice recognition technology aims to make machines understand human natural language and to use the recognized voice as a control signal in different fields.

At present, the voice recognition technology is online usually. The voice information input by the user is sent to the cloud via the network and recognized by the server in the cloud, so as to return back results to the user.

However, this mode depends on the network.

SUMMARY

The present disclosure aims to solve the above problems in the related art to at least some extent.

Accordingly, one objective of the present disclosure is to provide a method for recognizing a voice, which does not depend on the network to realize the voice recognition.

Another objective of the present disclosure is to provide a device for recognizing a voice.

In order to realize the above objectives, embodiments of a first aspect of the present disclosure provide a method for recognizing a voice, including: collecting voice information input by a user; extracting characteristics from the voice information to obtain characteristic information; decoding the characteristic information according to an acoustic model and a language model obtained in advance to obtain recognized voice information, in which the acoustic model is obtained by data compression in advance.

With the method for recognizing a voice provided by embodiments of the first aspect of the present disclosure, by performing the voice recognition in the offline mode, the voice recognition may be realized without the network, so it is user-friendly. Moreover, by performing the data compression on the acoustic model in advance, the acoustic model may be suitable to the mobile device, so as to achieve the voice recognition in the mobile device in the offline mode.

In order to realize the above objectives, embodiments of a second aspect of the present disclosure provide a device for recognizing a voice, including: a collecting module, configured to collect voice information input by a user; an extracting module, configured to extract characteristics from the voice information to obtain characteristic information; a decoding module, configured to decode the characteristic information according to an acoustic model and a language model obtained in advance to obtain recognized voice information, in which the acoustic model is obtained by data compression in advance.

With the device for recognizing a voice provided by embodiments of the second aspect of the present disclosure, by performing the voice recognition in the offline mode, the voice recognition may be realized without the network, so it is user-friendly. Moreover, by performing the data compression on the acoustic model in advance, the acoustic model may be suitable to the mobile device, so as to achieve the voice recognition in the mobile device in the offline mode.

In order to realize the above objectives, embodiments of a third aspect of the present disclosure provide a mobile device, including: a housing, a processor, a memory, a circuit board and a power supply circuit, in which the circuit board is arranged in a space enclosed by the housing, and the processor and the memory are arranged on the circuit board; the power supply circuit is configured to supply power for circuits or components in the mobile device; the memory is configured to store executable program codes; the processor is configured to run a program corresponding to the executable program codes by reading the executable program codes stored in the memory, so as to perform following acts: collecting voice information input by a user; extracting characteristics from the voice information to obtain characteristic information; decoding the characteristic information according to an acoustic model and a language model obtained in advance to obtain recognized voice information, in which the acoustic model is obtained by data compression in advance.

With the mobile device provided by embodiments of the third aspect of the present disclosure, by performing the voice recognition in the offline mode, the voice recognition may be realized without the network, so it is user-friendly. Moreover, by performing the data compression on the acoustic model in advance, the acoustic model may be suitable to the mobile device, so as to achieve the voice recognition in the mobile device in the offline mode.

Additional aspects and advantages of embodiments of present invention will be given in part in the following descriptions, become apparent in part from the following descriptions, or be learned from the practice of the embodiments of the present invention.

BRIEF DESCRIPTION OF THE DRAWINGS

These and other aspects and advantages of embodiments of the present invention will become apparent and more readily appreciated from the following descriptions made with reference to the accompanying drawings, in which.

DETAILED DESCRIPTION

Figure 1:
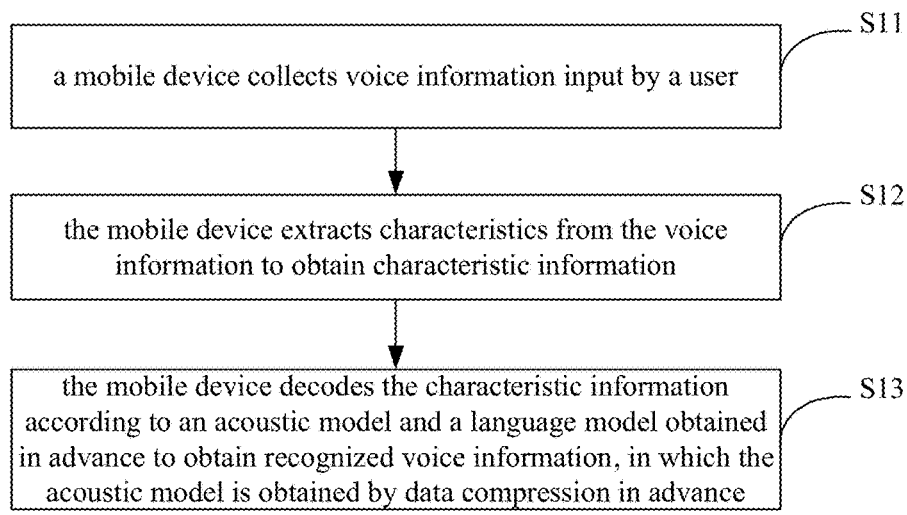
FIG. 1 is a flow chart showing a method for recognizing a voice according to an embodiment of the present disclosure.

Reference will be made in detail to embodiments of the present disclosure. Embodiments of the present disclosure will be shown in drawings, in which the same or similar elements and the elements having same or similar functions are denoted by like reference numerals throughout the descriptions. The embodiments described herein according to drawings are explanatory and illustrative, not construed to limit the present disclosure. In contrast, the present disclosure may include alternatives, modifications and equivalents within the spirit and scope of the appended claims.

FIG. 1 is a flow chart showing a method for recognizing a voice according to an embodiment of the present disclosure. The method includes following steps.

S11: a mobile device collects voice information input by a user.

The mobile device may be a mobile phone, a tablet personal computer, etc.

In the related art, after receiving the voice information input by the user, the mobile device may send the voice information to a server of the cloud via the network. The server recognizes the voice information and returns recognition results.

In this embodiment, in order to avoid that the voice recognition is limited to the network, the mobile device itself may realize the voice recognition in an offline mode.

S12: the mobile device extracts characteristics from the voice information to obtain characteristic information.

Figure 2:
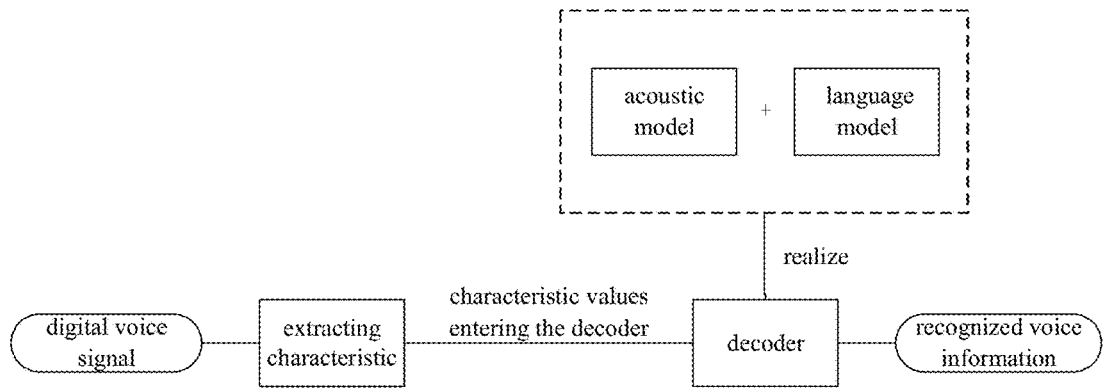
FIG. 2 is a flow chart showing voice recognition in an offline mode according to an embodiment of the present disclosure.

Referring to FIG. 2, firstly the analog voice information input by the user may be converted into the digital voice information. Then, the starting point and the ending point of the voice may be determined according to the voice activity detection (VAD), and then the characteristic extraction is performed.

S13: the mobile device decodes the characteristic information according to an acoustic model and a language model obtained in advance to obtain recognized voice information, in which the acoustic model is obtained by data compression in advance.

As shown in FIG. 2, the step of decoding often takes the most time. By matching the acoustic model and processing the language model, the decoder may achieve correspondences between the voice characteristic values and text strings, in which the acoustic model is much more complex than the language model. Therefore, the optimization of the acoustic model will bring a lot of benefits to the entire voice recognition system. In this embodiment, the data compression may be performed on the acoustic model, so as to avoid that the huge acoustic model cannot run on the mobile device.

This embodiment performs the voice recognition in the offline mode, so voice recognition may be realized without the network, so it is user-friendly. Moreover, by performing the data compression on the acoustic model in advance, the acoustic model may be suitable to the mobile device, so as to achieve the voice recognition in the mobile device in the offline mode.

Figure 3:
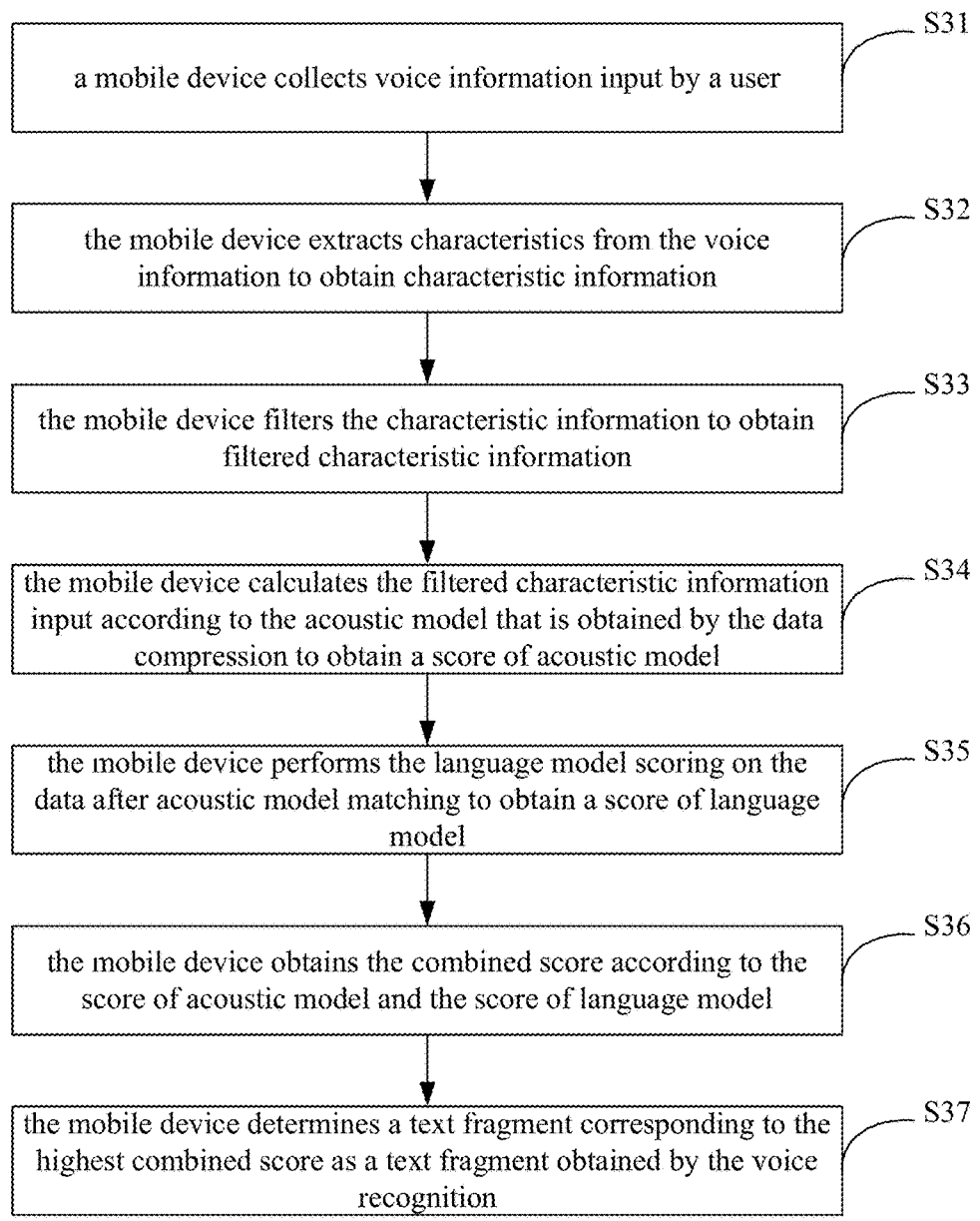
FIG. 3 is a flow chart showing a method for recognizing a voice according to another embodiment of the present disclosure.

FIG. 3 is a flow chart showing a method for recognizing a voice according to another embodiment of the present disclosure. The method includes following steps.

S31: a mobile device collects voice information input by a user.

S32: the mobile device extracts characteristics from the voice information to obtain characteristic information.

S33: the mobile device filters the characteristic information to obtain filtered characteristic information.

Figure 4:
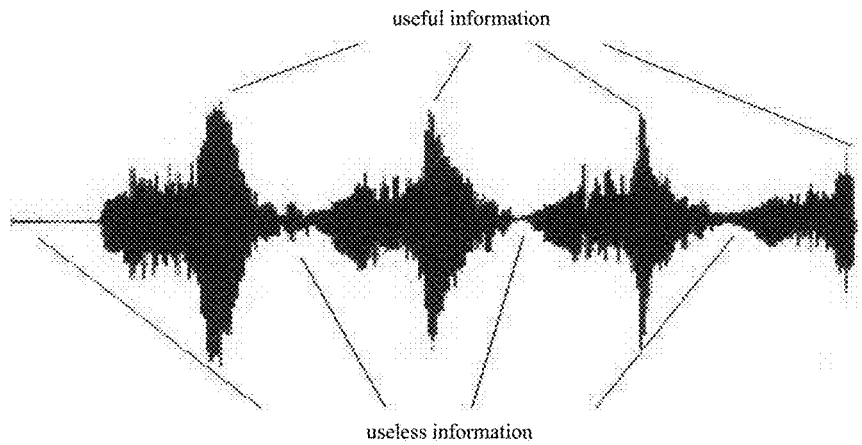
FIG. 4 is a schematic diagram illustrating filtering characteristic information according to an embodiment of the present disclosure.

As shown in FIG. 4, in a segment of the voice information, because of the pauses between words, a lot of useless information will be generated. In this embodiment, by filtering the useless information, it is possible to ensure that the characteristic information input into the decoder is compact and effective.

The filtering process includes but is not limited to frame skipping and the like.

S34: the mobile device calculates the filtered characteristic information input according to the acoustic model that is obtained by the data compression to obtain a score of acoustic model.

Figure 5:
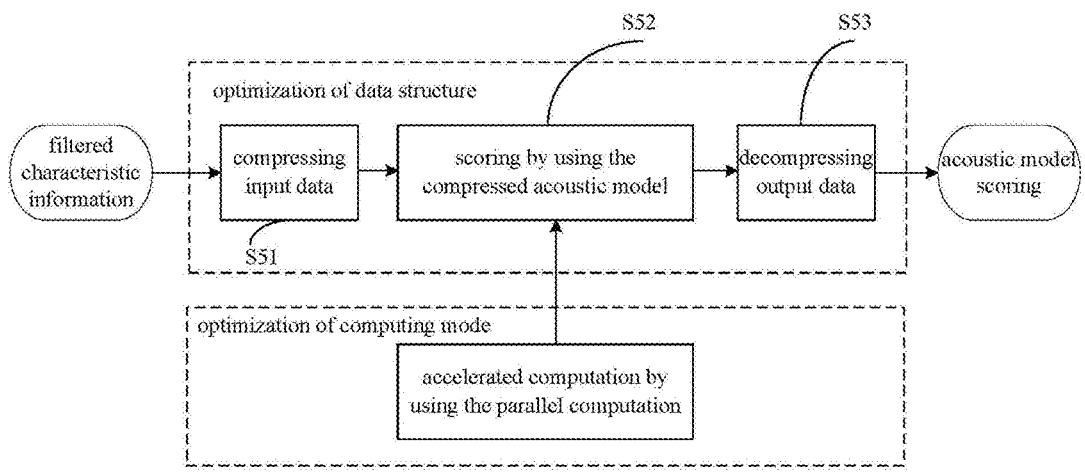
FIG. 5 is a flow chart showing processing by an acoustic model according to an embodiment of the present disclosure.

Specifically, the method for processing according to the acoustic model may refer to FIG. 5, which includes following steps.

S51: an input data is compressed.

The input data refers to the filtered characteristic information.

S52: the compressed input data is calculated in parallel according to the acoustic model that is obtained by the data compression to obtain an output data, in which the output data is the score of acoustic model.

The algorithm of performing the data compression on the input data and that of performing the data compression on the acoustic model are identical, so as to perform the corresponding matching.

The optimization in this embodiment may include an optimization of data structure and an optimization of computing mode, in which the optimization of data structure means that both the input data and the acoustic model are compressed, and the optimization of computing mode refers to using the parallel computation.

In the decoder, this embodiment employs a data compression method, so that the huge acoustic model may be compressed to suit scale used in the mobile device, while it is possible to ensure that the overall recognition rate is not declined. In addition, since the operation data during the entire decoding process are compressed, compared with the general decoding process, this embodiment has the data compression process and the data decompression process. However, since an amount of compressed data is one order of magnitude smaller than that of the amount of original data and an amount of calculation for input compression and output decompression is much smaller than that of model scoring, a period of time for decoding compressed data is much shorter than that for decoding uncompressed data.

This embodiment may fully exploit the parallelism of data calculation when performing the data compression. In the decoding of a large number of the input data, different input data are completely independent of each other when calculating and several steps unrelated to each other may exist in the calculation of the same data, so that this embodiment may use various parallel methods, which includes but is not limited to data parallel, instruction parallel, thread parallel, etc. The parallel optimization is performed in the whole decoding process, which has a huge time gain.

After using two optimization methods described above, the ratio of the time of decoding to the time of whole recognition is reduced to below 20% from above 95%, so the speed is enhanced over 150 times; the model scale shrinks to 15% of the original model scale. This indicator is completely suitable for applications in the mobile device.

S53: a data compression is performed on the output data to obtain a score of acoustic model.

After obtaining the score of acoustic model, a score of language model also may be obtained, and then the recognized voice information may be obtained according to the score of acoustic model and the score of language model. That is, the method in this embodiment further includes following steps.

S35: the mobile device performs the language model scoring on the data after acoustic model matching to obtain a score of language model.

After processing of the acoustic model, a score of each word in the acoustic model may be obtained, and then the language model scoring is performed on the corresponding word according to the score of each word.

Since the language model is much simpler than the acoustic model, the language model adopted by the server currently may be applied to the mobile device, so the current language model processing is used.

S36: the mobile device obtains the combined score according to the score of acoustic model and the score of language model.

The final score of models may be obtained by combining the score of acoustic model with the score of language model, and this method includes but is not limited to the weighted summation of $$score = W_{am} \cdot score_{am} + W_{lm} \cdot score_{lm}$$

where score is the final score, $W_{am}$ and $W_{lm}$ are weights of the acoustic model and the language model respectively, $score_{am}$ $score_{lm}$ are scores of the acoustic model and the language model respectively.

S37: the mobile device determines a text fragment corresponding to the highest combined score as a text fragment obtained by the voice recognition.

This embodiment may realize the voice recognition in the mobile device in the offline mode, and may be applied in software such as map navigation, and mobile phone inputting, which may accomplish the corresponding control by directly using the voice without inputting information by the user manually, thus enhancing the user's experience. This embodiment calculates and optimizes the data of the acoustic model in the decoding part, which may both ensure the recognition rate and control the occupied system resources in a reasonable range, and is suitable for deploying on the mobile device.

Figure 6:
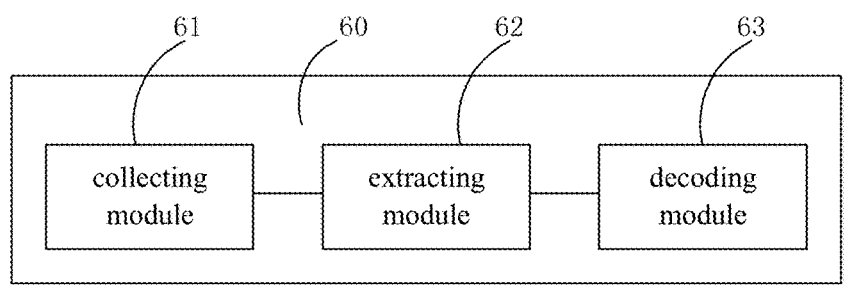
FIG. 6 is a schematic diagram illustrating a device for recognizing a voice according to an embodiment of the present disclosure.

FIG. 6 is a schematic diagram illustrating a device for recognizing a voice according to an embodiment of the present disclosure. The device 60 includes a collecting module 61, an extracting module 62 and a decoding module 63.

The collecting module 61 is configured to collect voice information input by a user.

The device may be a mobile device, in which the mobile device may be a mobile phone, a tablet personal computer, etc.

In the related art, after receiving the voice information input by the user, the mobile device may send the voice information to a server of the cloud via the network. The server recognizes the voice information and returns recognition results.

In this embodiment, in order to avoid that the voice recognition is limited to the network, the mobile device itself may realize the voice recognition in an offline mode.

The extracting module 62 is configured to extract characteristics from the voice information to obtain characteristic information.

Firstly, the analog voice information input by the user may be converted into the digital voice information. Then, the starting point and the ending point of the voice may be determined according to the voice activity detection (VAD), and then the characteristic extraction is performed.

The decoding module 63 is configured to decode the characteristic information according to an acoustic model and a language model obtained in advance to obtain recognized voice information, in which the acoustic model is obtained by data compression in advance.

The step of decoding often takes the most time. By matching the acoustic model and processing the language model, the decoder may achieve correspondences between the voice characteristic values and text strings, in which the acoustic model is much more complex than the language model. Therefore, the optimization of the acoustic model will bring a lot of benefits to the entire voice recognition system. In this embodiment, the data compression may be performed on the acoustic model, so as to avoid that the huge acoustic model cannot run on the mobile device.

This embodiment performs the voice recognition in the offline mode, so voice recognition may be realized without the network, so it is user-friendly. Moreover, by performing the data compression on the acoustic model in advance, the acoustic model may be suitable to the mobile device, so as to achieve the voice recognition in the mobile device in the offline mode.

Figure 7:
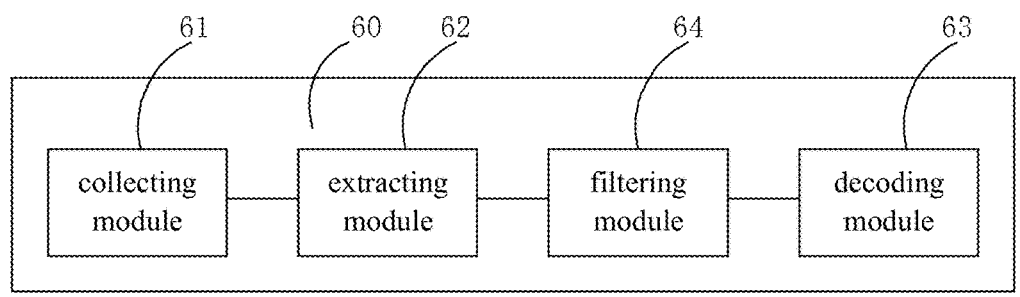
FIG. 7 is a schematic diagram illustrating a device for recognizing a voice according to another embodiment of the present disclosure.

FIG. 7 is a schematic diagram illustrating a device for recognizing a voice according to another embodiment of the present disclosure. The device 60 further includes a filtering module 64.

The filtering module 64 is configured to filter the characteristic information to obtain filtered characteristic information, so as to decode the filtered characteristic information.

As shown in FIG. 4, in a segment of the voice information, because of the pauses between words, a lot of useless information will be generated. In this embodiment, by filtering the useless information, it is possible to ensure that the characteristic information input into the decoder is compact and effective.

In an embodiment of the present disclosure, the filtering module 64 is specifically configured to perform an extraction of frame skipping on the characteristic information.

In an embodiment of the present disclosure, the decoding module 63 is specifically configured to:

perform a data compression on the characteristic information to obtain compressed characteristic information, and calculate the compressed characteristic information according to the acoustic model that is obtained by the data compression in advance to obtain a score of acoustic model;

calculate data after acoustic model scoring according to the language model to obtain a score of language model;

obtain the recognized voice information according to the score of acoustic model and the score of language model.

In an embodiment of the present disclosure, calculating the compressed characteristic information by the decoding module 63 includes:

performing a parallel computation on the compressed characteristic information.

In an embodiment of the present disclosure, the parallel computation used by the decoding module 63 includes at least one of data parallel computation, instruction parallel computation and thread parallel computation.

The algorithm of performing the data compression on the input data and that of performing the data compression on the acoustic model are identical, so as to perform the corresponding matching.

The optimization in this embodiment may include an optimization of data structure and an optimization of computing mode, in which the optimization of data structure means that both the input data and the acoustic model are compressed, and the optimization of computing mode refers to using the parallel computation.

In the decoder, this embodiment employs a data compression method, so that the huge acoustic model may be compressed to suit scale used in the mobile device, while it is possible to ensure that the overall recognition rate is not declined. In addition, since the operation data during the entire decoding process are compressed, compared with the general decoding process, this embodiment has the data compression process and the data decompression process. However, since an amount of compressed data is one order of magnitude smaller than that of the amount of original data and an amount of calculation for input compression and output decompression is much smaller than that of model scoring, a period of time for decoding compressed data is much shorter than that for decoding uncompressed data.

This embodiment may fully exploit the parallelism of data calculation when performing the data compression. In the decoding of a large number of the input data, different input data are completely independent of each other when calculating and several steps unrelated to each other may exist in the calculation of the same data, so that this embodiment may use various parallel methods, which includes but is not limited to data parallel, instruction parallel, thread parallel, etc. The parallel optimization is performed in the whole decoding process, which has a huge time gain.

After using two optimization methods described above, the ratio of the time of decoding to the time of whole recognition is reduced to below 20% from above 95%, so the speed is enhanced over 150 times; the model scale shrinks to 15% of the original model scale. This indicator is completely suitable for applications in the mobile device.

After obtaining the score of acoustic model, a score of language model also may be obtained, and then the recognized voice information may be obtained according to the score of acoustic model and the score of language model.

The final score of models may be obtained by combining the score of acoustic model with the score of language model, and this method includes but is not limited to the weighted summation of $$score = W_{am} \cdot score_{am} + W_{lm} \cdot score_{lm}$$

where score is the final score, $W_{am}$ and $W_{lm}$ are weights of the acoustic model and the language model respectively, $score_{am}$, $score_{lm}$ are scores of the acoustic model and the language model respectively.

A text fragment corresponding to the highest combined score is determined as a text fragment obtained by the voice recognition.

This embodiment may realize the voice recognition in the mobile device in the offline mode, and may be applied in software such as map navigation, and mobile phone inputting, which may accomplish the corresponding control by directly using the voice without inputting information by the user manually, thus enhancing the user's experience. This embodiment calculates and optimizes the data of the acoustic model in the decoding part, which may both ensure the recognition rate and control the occupied system resources in a reasonable range, and is suitable for deploying on the mobile device.

The present disclosure also provides a mobile device, including: a housing, a processor, a memory, a circuit board and a power supply circuit, in which the circuit board is arranged in a space enclosed by the housing, and the processor and the memory are arranged on the circuit board; the power supply circuit is configured to supply power for circuits or components in the mobile device; the memory is configured to store executable program codes; the processor is configured to run a program corresponding to the executable program codes by reading the executable program codes stored in the memory, so as to perform following acts:

S11': voice information input by a user is collected.

The mobile device may be a mobile phone, a tablet personal computer, etc.

In the related art, after receiving the voice information input by the user, the mobile device may send the voice information to a server of the cloud via the network. The server recognizes the voice information and returns recognition results.

In this embodiment, in order to avoid that the voice recognition is limited to the network, the mobile device itself may realize the voice recognition in an offline mode.

S12': characteristics are extracted from the voice information to obtain characteristic information.

Firstly, the analog voice information input by the user may be converted into the digital voice information. Then, the starting point and the ending point of the voice may be determined according to the voice activity detection (VAD), and then the characteristic extraction is performed.

S13': the characteristic information is decoded according to an acoustic model and a language model obtained in advance to obtain recognized voice information, in which the acoustic model is obtained by data compression in advance.

The step of decoding often takes the most time. By matching the acoustic model and processing the language model, the decoder may achieve correspondences between the voice characteristic values and text strings, in which the acoustic model is much more complex than the language model. Therefore, the optimization of the acoustic model will bring a lot of benefits to the entire voice recognition system. In this embodiment, the data compression may be performed on the acoustic model, so as to avoid that the huge acoustic model cannot run on the mobile device.

This embodiment performs the voice recognition in the offline mode, so voice recognition may be realized without the network, so it is user-friendly.

In another embodiment, the processor is configured to run a program corresponding to the executable program codes by reading the executable program codes stored in the memory, so as to perform following acts:

S31': voice information input by a user is collected.

S32': characteristics are extracted from the voice information to obtain characteristic information.

S33': the characteristic information is filtered to obtain filtered characteristic information.

As shown in FIG. 4, in a segment of the voice information, because of the pauses between words, a lot of useless information will be generated. In this embodiment, by filtering the useless information, it is possible to ensure that the characteristic information input into the decoder is compact and effective.

The filtering process includes but is not limited to frame skipping and the like.

S34': the filtered characteristic information input is calculated according to the acoustic model that is obtained by the data compression to obtain a score of acoustic model.

Specifically, the method for obtaining the score of acoustic model may include following steps.

S51': an input data is compressed.

The input data refers to the filtered characteristic information.

S52': the compressed input data is calculated in parallel according to the acoustic model that is obtained by the data compression to obtain an output data, in which the output data is the score of acoustic model.

The algorithm of performing the data compression on the input data and that of performing the data compression on the acoustic model are identical, so as to perform the corresponding matching.

The optimization in this embodiment may include an optimization of data structure and an optimization of computing mode, in which the optimization of data structure means that both the input data and the acoustic model are compressed, and the optimization of computing mode refers to using the parallel computation.

In the decoder, this embodiment employs a data compression method, so that the huge acoustic model may be compressed to suit scale used in the mobile device, while it is possible to ensure that the overall recognition rate is not declined. In addition, since the operation data during the entire decoding process are compressed, compared with the general decoding process, this embodiment has the data compression process and the data decompression process. However, since an amount of compressed data is one order of magnitude smaller than that of the amount of original data and an amount of calculation for input compression and output decompression is much smaller than that of model scoring, a period of time for decoding compressed data is much shorter than that for decoding uncompressed data.

This embodiment may fully exploit the parallelism of data calculation when performing the data compression. In the decoding of a large number of the input data, different input data are completely independent of each other when calculating and several steps unrelated to each other may exist in the calculation of the same data, so that this embodiment may use various parallel methods, which includes but is not limited to data parallel, instruction parallel, thread parallel, etc. The parallel optimization is performed in the whole decoding process, which has a huge time gain.

After using two optimization methods described above, the ratio of the time of decoding to the time of whole recognition is reduced to below 20% from above 95%, so the speed is enhanced over 150 times; the model scale shrinks to 15% of the original model scale. This indicator is completely suitable for applications in the mobile device.

S53': a data compression is performed on the output data to obtain a score of acoustic model.

After obtaining the score of acoustic model, a score of language model also may be obtained, and then the recognized voice information may be obtained according to the score of acoustic model and the score of language model. That is, the method in this embodiment further includes following steps.

S35': the language model scoring is performed on the data after acoustic model matching to obtain a score of language model.

After processing of the acoustic model, a score of each word in the acoustic model may be obtained, and then the language model scoring is performed on the corresponding word according to the score of each word.

Since the language model is much simpler than the acoustic model, the language model adopted by the server currently may be applied to the mobile device, so the current language model processing is used.

S36': the combined score is obtained according to the score of acoustic model and the score of language model.

The final score of models may be obtained by combining the score of acoustic model with the score of language model, and this method includes but is not limited to the weighted summation of $$score = W_{am} \cdot score_{am} + W_{lm} \cdot score_{lm}$$

where score is the final score, $W_{am}$ and $W_{lm}$ are weights of the acoustic model and the language model respectively, $score_{am}$, $score_{lm}$ are scores of the acoustic model and the language model respectively.

S37': a text fragment corresponding to the highest combined score is determined as a text fragment obtained by the voice recognition.

This embodiment may realize the voice recognition in the mobile device in the offline mode, and may be applied in software such as map navigation, and mobile phone inputting, which may accomplish the corresponding control by directly using the voice without inputting information by the user manually, thus enhancing the user's experience. This embodiment calculates and optimizes the data of the acoustic model in the decoding part, which may both ensure the recognition rate and control the occupied system resources in a reasonable range, and is suitable for deploying on the mobile device.

The present disclosure also provides a mobile device, including:

one or more processors;

a memory;

one or more programs, in which the one or more programs are stored in the memory, and when executed by the one or more processors, perform following operations:

collecting voice information input by a user;

extracting characteristics from the voice information to obtain characteristic information;

decoding the characteristic information according to an acoustic model and a language model obtained in advance to obtain recognized voice information, in which the acoustic model is obtained by data compression in advance.

It is to be understood that, in the description, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for recognizing a voice, comprising:
    collecting, with a processor, voice information input by a user;
    extracting, with the processor, characteristics from the voice information to obtain characteristic information;
    decoding, with the processor, the characteristic information according to an acoustic model and a language model obtained in advance to obtain recognized voice information, wherein the acoustic model is obtained by data compression in advance;
    wherein decoding the characteristic information according to an acoustic model and a language model obtained in advance to obtain recognized voice information comprises:
        performing a data compression on the characteristic information to obtain compressed characteristic information, and calculating the compressed characteristic information according to the acoustic model that is obtained by the data compression in advance to obtain a score of acoustic model;
        calculating data after acoustic model scoring according to the language model to obtain a score of language model;
        obtaining the recognized voice information according to the score of acoustic model and the score of language model.

2. The method according to claim 1, wherein after obtaining characteristic information, the method further comprises:
    filtering, with the processor, the characteristic information to obtain filtered characteristic information, so as to decode the filtered characteristic information.

3. The method according to claim 2, wherein filtering the characteristic information comprises:
    performing an extraction of frame skipping on the characteristic information.

4. The method according to claim 1, wherein calculating the compressed characteristic information comprises:
    performing a parallel computation on the compressed characteristic information.

5. The method according to claim 4, wherein the parallel computation comprises at least one of data parallel computation, instruction parallel computation and thread parallel computation.

6. A device for recognizing a voice, comprising:
    a collecting module, configured to collect with a processor, voice information input by a user;
    an extracting module, configured to extract with the processor, characteristics from the voice information to obtain characteristic information;
    a decoding module, configured to decode with the processor, the characteristic information according to an acoustic model and a language model obtained in advance to obtain recognized voice information, wherein the acoustic model is obtained by data compression in advance;
    wherein the decoding module is configured to:
        perform a data compression on the characteristic information to obtain compressed characteristic information, and calculate the compressed characteristic information according to the acoustic model that is obtained by the data compression in advance to obtain a score of acoustic model;
        calculate data after acoustic model scoring according to the language model to obtain a score of language model;
        obtain the recognized voice information according to the score of acoustic model and the score of language model.

7. The device according to claim 6, further comprising:
    a filtering module, configured to filter with the processor, the characteristic information to obtain filtered characteristic information, so as to decode the filtered characteristic information.

8. The device according to claim 7, wherein the filtering module is configured to perform an extraction of frame skipping on the characteristic information.

9. The device according to claim 6, wherein the decoding module calculates the compressed characteristic information by:
    performing a parallel computation on the compressed characteristic information.

10. The device according to claim 9, wherein the parallel computation comprises at least one of data parallel computation, instruction parallel computation and thread parallel computation.

11. A mobile device, comprising:
    one or more processors;
    a memory;

one or more programs, wherein the one or more programs are stored in the memory, and when executed by the one or more processors, perform following operations:

collecting voice information input by a user;

extracting characteristics from the voice information to obtain characteristic information;

decoding the characteristic information according to an acoustic model and a language model obtained in advance to obtain recognized voice information, wherein the acoustic model is obtained by data compression in advance;

wherein decoding the characteristic information according to an acoustic model and a language model obtained in advance to obtain recognized voice information comprises:

performing a data compression on the characteristic information to obtain compressed characteristic information, and calculating the compressed characteristic information according to the acoustic model that is obtained by the data compression in advance to obtain a score of acoustic model;

calculating data after acoustic model scoring according to the language model to obtain a score of language model;

obtaining the recognized voice information according to the score of acoustic model and the score of language model.

\* \* \* \* \*